(12) United States Patent
Rinne et al.

(10) Patent No.: US 11,546,841 B2
(45) Date of Patent: Jan. 3, 2023

(54) METHOD AND APPARATUS FOR FACILITATING INTERWORKING OF CELLULAR RADIO ACCESS NETWORKS AND WIRELESS LOCAL AREA NETWORKS

(71) Applicant: Nokia Technologies Oy, Espoo (FI)

(72) Inventors: Mika Rinne, Espoo (FI); Sami Kekki, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 14/890,143

(22) PCT Filed: May 30, 2013

(86) PCT No.: PCT/IB2013/054484
§ 371 (c)(1),
(2) Date: Nov. 9, 2015

(87) PCT Pub. No.: WO2014/191797
PCT Pub. Date: Dec. 4, 2014

(65) Prior Publication Data
US 2016/0119862 A1 Apr. 28, 2016

(51) Int. Cl.
*H04W 48/18* (2009.01)
*H04W 36/14* (2009.01)
(Continued)

(52) U.S. Cl.
CPC .......... *H04W 48/18* (2013.01); *H04W 36/14* (2013.01); *H04W 36/18* (2013.01); *H04W 48/08* (2013.01);
(Continued)

(58) Field of Classification Search
CPC ..... H04W 36/14; H04W 36/18; H04W 48/08; H04W 48/18; H04W 84/042;
(Continued)

(56) References Cited

U.S. PATENT DOCUMENTS

2008/0107051 A1* 5/2008 Chen .............. H04W 48/18
455/552.1
2010/0323698 A1 12/2010 Rune et al.
(Continued)

FOREIGN PATENT DOCUMENTS

CN 102413531 A * 4/2012
CN 101374295 B * 11/2012
(Continued)

OTHER PUBLICATIONS

International Search Report and Written Opinion received for corresponding Patent Cooperation Treaty Application No. PCT/IB2013/054484, dated Feb. 17, 2014, 16 pages.
(Continued)

*Primary Examiner* — Dung Hong
(74) *Attorney, Agent, or Firm* — Mintz Levin Cohn Ferris Glovsky and Popeo, P.C.

(57) ABSTRACT

A method, apparatus and computer program product are provided to facilitate interworking a plurality of cellular radio access networks and wireless local area networks (WLANs). In the context of a method, a set of information is maintained for a plurality of different cellular radio access networks that defines a relative priority of selection among the cellular radio access networks. The method also includes maintaining wireless access selection information defining a relative priority of selection among one or more WLANs relative to the cellular radio access networks. The method also permits the relative priority of the WLANs to be modified without modification of the set of information. For example, the relative priority the WLANs may be modified in a manner specific to the user equipment or specific to a cell. The method may also include causing notification to be provided to user equipment of the set of information and the wireless access selection information.

24 Claims, 13 Drawing Sheets

(51) Int. Cl.
*H04W 36/18* (2009.01)
*H04W 48/08* (2009.01)
*H04W 8/18* (2009.01)
*H04W 84/04* (2009.01)
*H04W 84/12* (2009.01)

(52) U.S. Cl.
CPC ............ *H04W 8/18* (2013.01); *H04W 84/042* (2013.01); *H04W 84/12* (2013.01)

(58) Field of Classification Search
CPC ....... H04W 84/12; H04W 8/18; H04W 88/06; H04W 28/08; H04W 36/22; H04W 36/0022; H04W 28/0289; H04W 48/06; H04W 92/02; H04W 36/0083; H04W 36/0094; H04W 36/38
See application file for complete search history.

(56) References Cited

U.S. PATENT DOCUMENTS

| | | | |
|---|---|---|---|
| 2011/0075608 A1 | 3/2011 | Chai et al. | |
| 2011/0110300 A1* | 5/2011 | Sachs | H04W 48/04 370/328 |
| 2011/0176424 A1 | 7/2011 | Yang et al. | |
| 2012/0196644 A1 | 8/2012 | Scherzer et al. | |
| 2012/0230304 A1 | 9/2012 | Barbu et al. | |
| 2014/0247807 A1* | 9/2014 | Westerberg | H04W 36/32 370/331 |
| 2018/0310208 A1* | 10/2018 | Lohtia | H04W 48/08 |

FOREIGN PATENT DOCUMENTS

| | | | | |
|---|---|---|---|---|
| CN | 104247517 B | * | 7/2018 | ............ H04W 48/18 |
| EP | 2364048 | | 9/2011 | |
| IN | 218520 B | | 5/2008 | |
| JP | 2005198322 A | * | 7/2005 | ............ H04W 48/18 |
| WO | 2006/078627 A2 | | 7/2006 | |
| WO | 2008107766 | | 9/2008 | |
| WO | 2009127238 | | 10/2009 | |
| WO | 2012/135994 A1 | | 10/2012 | |

OTHER PUBLICATIONS

3GPP: 3rd Generation Partnership Project; Technical Specification Group Services and System Aspects; Architecture enhancements for non-3GPP accesses (Release 11'), Dec. 18, 2012 pp. 2012-2012.

3rd Generation Partnership Project; Technical Specification Group Services and System Aspects; Optimized Offloading to WLAN in GGPP-RAT mobility; (Release 12)', 3rd Draft; 23890-040 RM, 3rd Generation Partnership Project (3GPP), Mobile Competence Centre; 650 Route Des Lucioles; F-06921 Sophia-Antipolis Cedex; France Apr. 19, 2013.

"New Study Item Proposal on WLAN/3GPP Radio Interworking", 3GPP TSG-RAN Meeting #58, RP-122038, Agenda Item: 13.2, Intel Corporation, Dec. 4-7, 2012, 6 pages.

"3rd Generation Partnership Project; Technical Specification Group Services and System Aspects; General Packet Radio Service (GPRS) enhancements for Evolved Universal Terrestrial Radio Access Network (E-UTRAN) access Release 12)", 3GPP TS 23.401, V12.0.0, Mar. 2013, pp. 1-290.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 11)", 3GPP TS 36.300, V11.5.0, Mar. 2013, pp. 1-209.

"3rd Generation Partnership Project; Technical Specification Group Radio Access Network; Evolved Universal Terrestrial Radio Access (E-UTRA); Radio Resource Control (RRC);Protocol specification (Release 11)", 3GPP TS 36.331, V11.3.0, Mar. 2013, pp. 1-344.

Modeas et al., "Radio Access Selection In Integrated UMTS/WLAN Networks", Int. J. Communications, Network and System Sciences, vol. 2, No. 9, Dec. 2009, pp. 805-821.

"Cellular-Wi-Fi Integration", Interdigital White Paper, Jun. 2012, pp. 1-26.

European Office Action received for corresponding European Patent Application No. 13741836.4, dated Feb. 7, 2017, 7 pages.

* cited by examiner

| | RAT and frequency selection priority | | | | | | |
|---|---|---|---|---|---|---|---|
| Index | 7 | 6 | 5 | 4 | 3 | 2 | 1 |
| 1 | | LTE2100 | LTE2600 | UMTS2100 | 2G1800 | UMTS900 | |
| 2 | | LTE2600 | Wi-Fi | LTE800 | UMTS900 | UMTS2100 | |
| 3 | | LTE2600 | LTE800 | UMTS | Wi-Fi | 2G | |
| 4 | | | | | | | |

Figure 4

| Index | 7 | 6 | 5 | 4 | 3 | 2 | 1 |
|---|---|---|---|---|---|---|---|
| | RAT and frequency selection priority |||||||
| 1 | | LTE2600 | UMTS2100 | UMTS900 | 2G1800 | | |
| 2 | | LTE2600 | UMTS2100 | LTE800 | UMTS900 | | |
| 3 | | LTE2600 | LTE800 | UMTS | 2G | | |
| 4 | | | | | | | |

Figure 5

| Set of Preferences | |
|---|---|
| Leaf | Policy |
| Priority 9 | Use SSID = OwnHotspot for data > 20 Mbps, use always for port type NetFlix |
| Priority 8 | Use SSID OwnHotspot for all data bearers (port type = http) |
| Priority 7 | Use 3GPP RAT [ref. RAT selection priorities] |
| Priority 6 | Use SSID = OwnHotspot and SSID = RoamingPartner |

Figure 12

METHOD AND APPARATUS FOR FACILITATING INTERWORKING OF CELLULAR RADIO ACCESS NETWORKS AND WIRELESS LOCAL AREA NETWORKS

RELATED APPLICATION

This application was originally filed as PCT Application No. PCT/IB2013/054484 filed May 30, 2013.

TECHNOLOGICAL FIELD

An example embodiment of the present disclosure relates generally to the interworking of radio access networks and, more particularly, to the interworking of cellular radio access networks and wireless local area networks.

BACKGROUND

A variety of access networks may be utilized by user equipment in order to access a core network. For example, user equipment may utilize a variety of cellular radio access networks, such as long term evolution (LTE) radio access networks and universal mobile telecommunications system (UMTS) radio access networks as well as second generation (2G) radio access networks. Additionally, the different types of radio access networks may also operate at different frequencies such that LTE radio access networks may be provided that operate at 800 MHz, 2100 MHz and 2600 MHz.

In order to facilitate selection of a radio access network, one or more radio access technology (RAT) and frequency selection priority (RFSP) profiles may be defined. Each RFSP profile defines a prioritized ordering of radio access networks such that user equipment may attempt to utilize radio access networks to access a core network in the prioritized order set forth by the respective RFSP profile. Each profile may be identified by an RFSP index. The set of RFSP profiles may be initially provided by the network, such as a mobility management entity (MME) or the home subscriber server (HSS), and may be stored both by the network, such as an access point, e.g., a node B or evolved Node B (eNB), that serves the user equipment (UE), as well as the user equipment itself. The set of RFSP profiles to be utilized by the user equipment may be identified by a RFSP index that is provided by the network, such as by the MME or the HSS subscription profile, and is delivered to the user equipment, such as in the idle mode MobilityControl information element (1E) broadcast in the system information message.

An increasing number of wireless local area networks (WLANs) are being deployed and being utilized by WLAN stations (STA) with the trend toward increasing Wi-Fi usage expected to continue. Mobile devices may include the WLAN station capabilities and cellular user equipment capabilities, the capabilities of which may be independent of each other and may be selected suitable for a given device type. Generally, any device communicating in said networks is referred to herein as user equipment. As such, user equipment is more frequently faced with the decision as to whether to utilize a cellular radio access network, such as an LTE cell, or a WLAN. The choice between a cellular radio access network and a WLAN has typically been governed by the user of the user equipment, such as by user settings or configurations or by concrete momentary choices by the user. In some instances, the selection among cellular radio access networks or WLAN networks may be assisted by a network server, such as the access network discovery and selection function (ANDSF) server, that may store the preferences set by the operator for the user. Among other things, the user settings or configurations or the user's preferences as maintained by the ANDSF server may generally define selection criteria, Inter System Routing Policies (ISRP), selection thresholds and network preferences, e.g., service set identifier (SSID), etc. for different locations or geographical areas. However, interworking between the radio access networks and WLANs is limited and, in any event, is relatively static. Often these choices are ON/OFF selections for either enabling the use or disabling the use of one, e.g., either the cellular radio access networks or the WLANs, while having an independent choice for the other.

BRIEF SUMMARY

A method, apparatus and computer program product are provided in accordance with an example embodiment of the present disclosure in order to facilitate interworking a plurality of cellular radio access networks and WLANs. In an example embodiment, a method, apparatus and computer program product permit the relative prioritization and, as a result, the order of selection of the cellular radio access networks and the WLANs to be dynamically varied based upon various conditions, such as network load, traffic volume, radio bearer quality, radio bearer requirement, user experience or the like. As such, the method, apparatus and computer program product of an example embodiment may define the relative prioritization between the cellular radio access networks and the WLANs on a more granular basis, such as on a basis specific to a user equipment, specific to a cell or the like, thereby providing improved service for the various subscribers. The method, apparatus and computer program product of an example embodiment apply to radio access selection, and may include selection of these radio access networks in connection to the same core network or to different core networks, or different core network domains (subnet).

In an example embodiment, a method is provided that includes maintaining a set of information for a plurality of different cellular radio access networks that defines a relative priority of selection among the cellular radio access networks. The method of this embodiment also includes maintaining wireless access selection information defining a relative priority of one or more WLANs relative to the cellular radio access networks. The method also permits the relative priority of selection among the WLANs to be modified without modification of the set of information regarding the cellular accesses. For example, the relative priority of the WLANs may be modified in a manner specific to the user equipment, specific to a subscribed user class, specific to a group of users, specific to a cell, specific to a usage profile, specific to a traffic type or specific to one or more active sessions. The method also includes causing notification to be provided to user equipment of at least some of the set of information and the wireless access selection information.

A method may provide notification by causing signaling of the wireless access selection information in an information element independent of the set of information. For example, a notification may be provided in a connected state prior to a transition to an idle state. In one example embodiment, the set of information includes an indication of the WLANs, such as the allowed or favored WLANs. In another example embodiment, the set of information may be independent of any indication of the WLANs.

In another example embodiment, an apparatus is provided that includes at least one processor and at least one memory including computer program code with the at least one memory and the computer program code configured to, with the processor, cause the apparatus to at least maintain a set of information for a plurality of different cellular radio access networks that defines a relative priority of selection among the cellular radio access networks. The at least one memory and the computer program code are also configured to, with the processor, cause the apparatus of this embodiment to maintain wireless access selection information defining a relative priority of selection among one or more WLANs relative to the cellular radio access networks. The at least one memory and the computer program code are also configured to, with the processor, cause the apparatus to permit the relative priority of the WLANs to be modified without modification of the set of information. For example, the relative priority the WLANs may be modified in a manner specific to the user equipment, specific to a subscribed user class, specific to a group of users, specific to a cell, specific to a usage profile, specific to a traffic type or specific to one or more active sessions. The at least one memory and the computer program code are also configured to, with the processor, cause the apparatus of this embodiment to cause notification to be provided to user equipment of at least some of the set of information and the wireless access selection information.

The at least one memory and the computer program code may be configured to, with the processor, cause the apparatus to provide notification by causing signaling of the wireless access selection information in an information element independent of the set of information. For example, a notification may be provided in a connected state prior to a transition to an idle state. In one example embodiment, the set of information includes an indication of the WLANs, such as the allowed or favored WLANs. In another example embodiment, the set of information may be independent of any indication of the WLANs.

In a further example embodiment, a computer program product is provided that includes at least one non-transitory computer-readable storage medium having computer-executable program code portions stored therein with the computer-executable program code portions including program code instructions for maintaining a set of information for a plurality of different cellular radio access networks that defines a relative priority of selection among the cellular radio access networks. The computer-executable program code portions of this embodiment include program code instructions for maintaining wireless access selection information defining a relative priority of selection among one or more WLANs relative to the cellular radio access networks. The computer-executable program code portions also include program code instructions for permitting the relative priority of the WLANs to be modified without modification of the set of information. For example, the relative priority of the WLANs may be modified in a manner specific to the user equipment, specific to a subscribed user class, specific to a group of users, specific to a cell, specific to a usage profile, specific to a traffic type or specific to one or more active sessions. The computer-executable program code portions of this embodiment further include program code instructions for causing notification to be provided to user equipment of at least some of the set of information and the wireless access selection information.

The program code instructions for causing notification to be provided may include program code instructions for causing signaling of the wireless access selection information in an information element independent of the set of information. For example, a notification may be provided in a connected state prior to a transition to an idle state. In one example embodiment, the set of information includes an indication of the WLANs, such as the allowed or favored WLANs. In another example embodiment, the set of information may be independent of any indication of the WLANs.

In yet another example embodiment, an apparatus is provided that includes means for maintaining a set of information for a plurality of different cellular radio access networks that defines a relative priority of selection among the cellular radio access networks. The apparatus of this embodiment also includes means for maintaining wireless access selection information defining a relative priority of selection among one or more WLANs relative to the cellular radio access networks. The apparatus also includes means for permitting the relative priority of the WLANs to be modified without modification of the set of information. For example, the relative priority the WLANs may be modified in a manner specific to the user equipment, specific to a subscribed user class, specific to a group of users, specific to a cell, specific to a usage profile, specific to a traffic type or specific to one or more active sessions. The apparatus also includes means for causing notification to be provided to user equipment of at least some of the set of information and the wireless access selection information.

In an example embodiment, a method is provided that includes providing access to a set of information for a plurality of different cellular radio access networks and to wireless access selection information. The set of information defines a relative priority of selection among the cellular radio access networks. The wireless access selection information defines a relative priority of selection among one or more WLANs relative to the cellular radio access networks. The method of this embodiment also provides information that permits the relative priority of the WLANs to be modified without modification of this set of information. The method further includes selecting a respective one of the cellular radio access networks or the WLANs based upon the relative priorities.

The method of an example embodiment may provide information that permits the relative priority of the WLANs to be modified by providing information that permits the relative priority of the WLANs to be modified in a manner specific to the user equipment, specific to a subscribed user class, specific to a group of users, specific to a cell, specific to a usage profile, specific to a traffic type or specific to one or more active sessions. The method of an example embodiment may also include, in an instance in which one of WLANs is to be selected, determining the respective WLAN to be selected based upon a set of preferences, independent of the set of information and the wireless access selection information. In this embodiment, the method may further include determining a respective set of preferences from among a plurality of sets of preferences to govern selection of the respective WLAN. In an instance in which one of the WLANs is to be selected, the method may also include camping on a cellular radio access network based upon the set of information while selecting the respective WLAN. The method of an example embodiment may also include remaining in a connected state with a cellular radio access network, while selecting the respective WLAN. In an example embodiment, the set of preferences is provided by management object (MO), an access network discovery and selection object, a hot spot object, a home network object, a visited network object, a device management object, a vendor specific object or an organization specific object. The set of preferences may be based upon a plug in object, WLAN preferences, a selection history or a definition present in the subscriber identification module or an access network certificate stamp as a software configuration in the device. The set of information may include an indication of the WLANs, such as the allowed or favored WLANs. Alternatively, the set of information may be independent of any indication of the WLANs.

In another example embodiment, an apparatus is provided that includes at least one processor and at least one memory including computer program code with the at least one memory and the computer program code configured to, with the processor, cause the apparatus to at least provide access to a set of information for a plurality of different cellular radio access networks and to wireless access selection information. The set of information defines a relative priority of selection among the cellular radio access networks. The wireless access selection information defines a relative priority of selection among one or more WLANs relative to the cellular radio access networks. The at least one memory and the computer program code are also configured to, with the processor, cause the apparatus to of this embodiment to provide information that permits the relative priority of the WLANs to be modified without modification of this set of information. The at least one memory and the computer program code are further configured to, with the processor, cause the apparatus to select a respective one of the cellular radio access networks or the WLANs based upon the relative priorities.

The at least one memory and the computer program code may be configured to, with the processor, cause the apparatus of an example embodiment to provide information that permits the relative priority of the WLANs to be modified by providing information that permits the relative priority of the WLANs to be modified in a manner specific to the user equipment, specific to a subscribed user class, specific to a group of users, specific to a cell, specific to a usage profile, specific to a traffic type or specific to one or more active sessions. The at least one memory and the computer program code may also be configured to, with the processor, cause the apparatus to determine, in an instance in which one of WLANs is to be selected, the respective WLAN to be selected based upon a set of preferences, independent of the set of information and the wireless access selection information. In this embodiment, the at least one memory and the computer program code may be configured to, with the processor, cause the apparatus to determine a respective set of preferences from among a plurality of sets of preferences to govern selection of the respective WLAN. In an instance in which one of the WLANs is to be selected, the at least one memory and the computer program code may also be configured to, with the processor, cause the apparatus to camp on a cellular radio access network based upon the set of information while selecting the respective WLAN. The at least one memory and the computer program code may also be configured to, with the processor, cause the apparatus to remain in a connected state with a cellular radio access network, while selecting the respective WLAN.

In an example embodiment, the set of preferences is provided by management object, an access network discovery and selection object, a hot spot object, a home network object, a visited network object, a device management object, a vendor specific object or an organization specific object. The set of preferences may be based upon a plug in object, WLAN preferences, a selection history or a definition present in the subscriber identification module or an access network certificate stamp as a softwared configuration in the device. The set of information may include an indication of the WLANs, such as the allowed or favored WLANs. Alternatively, the set of information may be independent of any indication of the WLANs.

In a further example embodiment, a computer program product is provided that includes at least one non-transitory computer-readable storage medium having computer-executable program code portions stored therein with the computer-executable program code portions including program code instructions for providing access to a set of information for a plurality of different cellular radio access networks and to wireless access selection information. The set of information defines a relative priority of selection among the cellular radio access networks. The wireless access selection information defines a relative priority of selection among one or more WLANs relative to the cellular radio access networks. The computer-executable program code portions of this example embodiment also include program code instructions for providing information that permits the relative priority of the WLANs to be modified without modification of this set of information. The computer-executable program code portions further include program code instructions for selecting a respective one of the cellular radio access networks or the WLANs based upon the relative priorities.

The computer-executable program code portions of an example embodiment also include program code instructions for providing information that permits the relative priority of the WLANs to be modified by providing information that permits the relative priority of the WLANs to be modified in a manner specific to the user equipment, specific to a subscribed user class, specific to a group of users, specific to a cell, specific to a usage profile, specific to a traffic type or specific to one or more active sessions. The computer-executable program code portions of an example embodiment may also include program code instructions for, in an instance in which one of WLANs is to be selected, determining the respective WLAN to be selected based upon a set of preferences, independent of the set of information and the wireless access selection information. In this embodiment, the computer-executable program code portions may further include program code instructions for determining a respective set of preferences from among a plurality of sets of preferences to govern selection of the respective WLAN. In an instance in which one of the WLANs is to be selected, the method may also include camping on a cellular radio access network based upon the set of information while selecting the respective WLAN. The computer-executable program code portions of an example embodiment may also include program code instructions for remaining in a connected state with a cellular radio access network, while selecting the respective WLAN.

In an example embodiment, the set of preferences is provided by management object, an access network discovery and selection object, a hot spot object, a home network object, a visited network object, a device management object, a vendor specific object or an organization specific object. The set of preferences may be based upon a plug in object, WLAN preferences, a selection history or a definition present in the subscriber identification module or an access network certificate stamp as a software configuration in the device. The set of information may include an indication of the WLANs, such as the allowed or favored WLANs. Alternatively, the set of information may be independent of any indication of the WLANs.

In yet another example embodiment, an apparatus is provided that includes means for providing access to a set of information for a plurality of different cellular radio access networks and to wireless access selection information. The set of information defines a relative priority of selection among the cellular radio access networks. The wireless access selection information defines a relative priority of selection among one or more WLANs relative to the cellular radio access networks. The apparatus of this embodiment also includes means for providing information that permits the relative priority of the WLANs to be modified without modification of this set of information. The apparatus further includes means for selecting a respective one of the cellular radio access networks or the WLANs based upon the relative priorities.

BRIEF DESCRIPTION OF THE DRAWINGS

Figure 1:
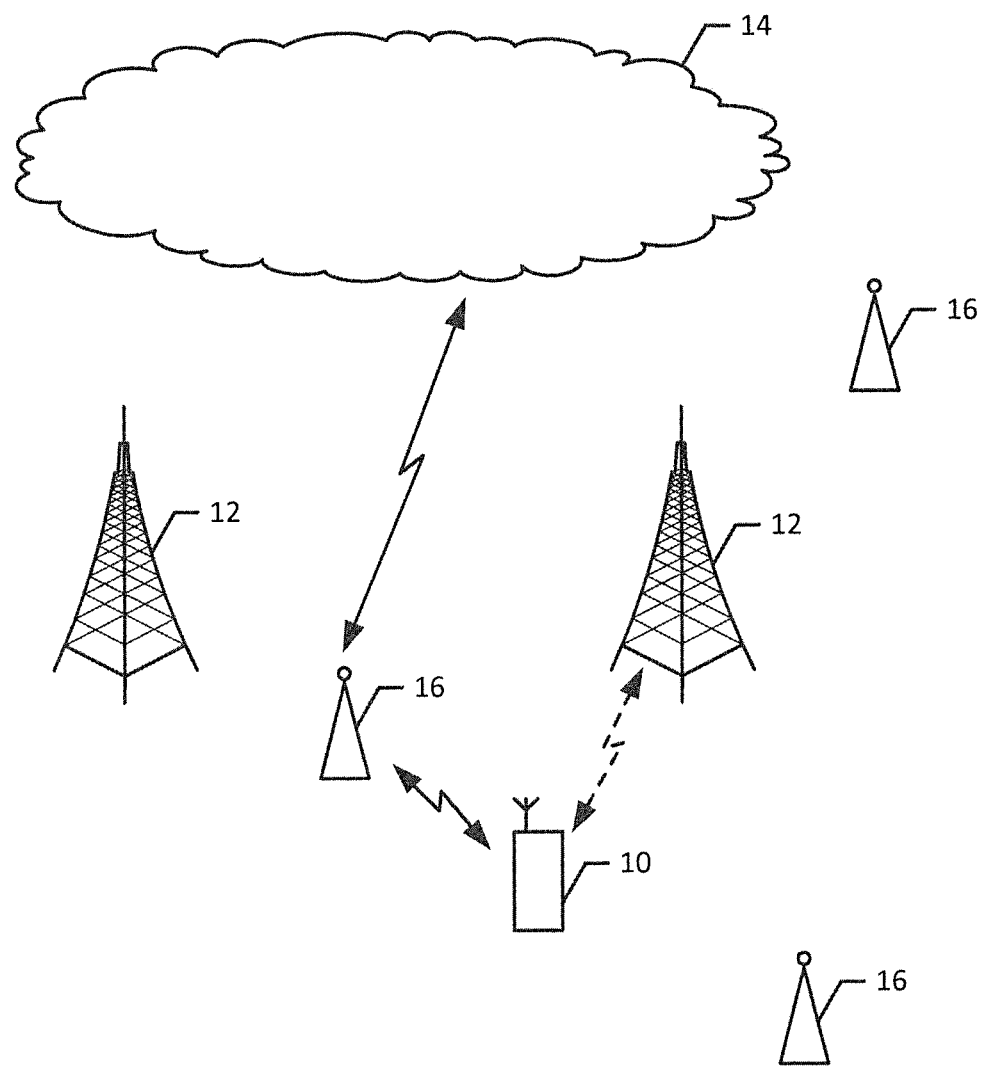
Figure 2:
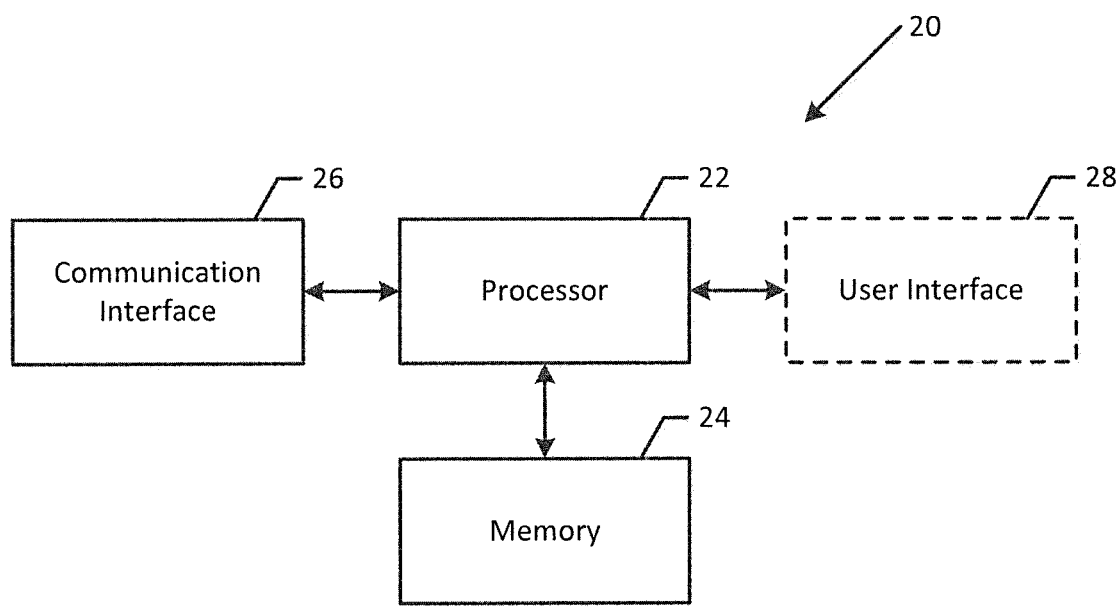
Figure 3:
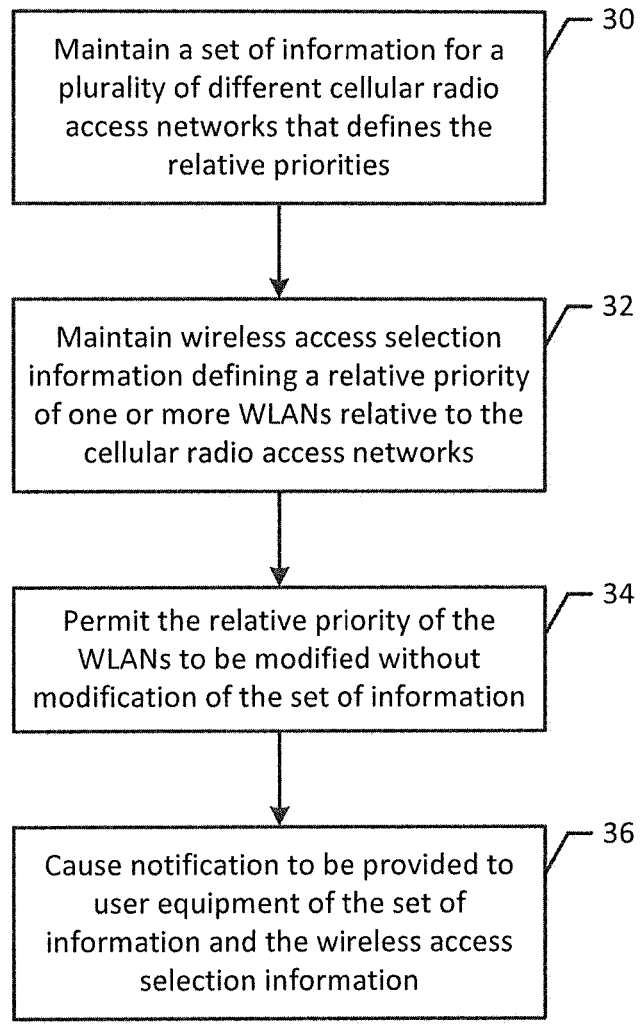
Figure 6:
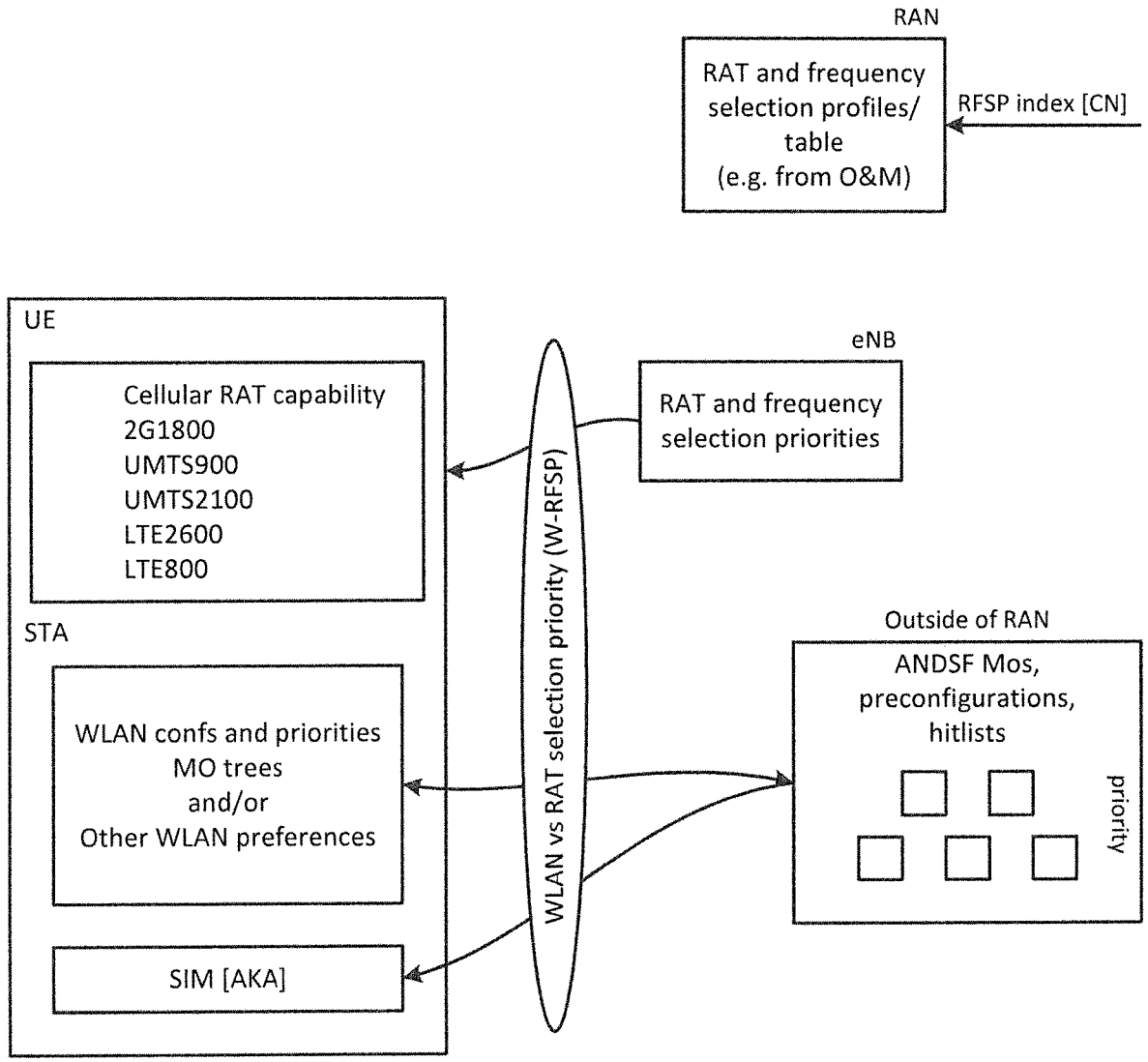
Figure 7:
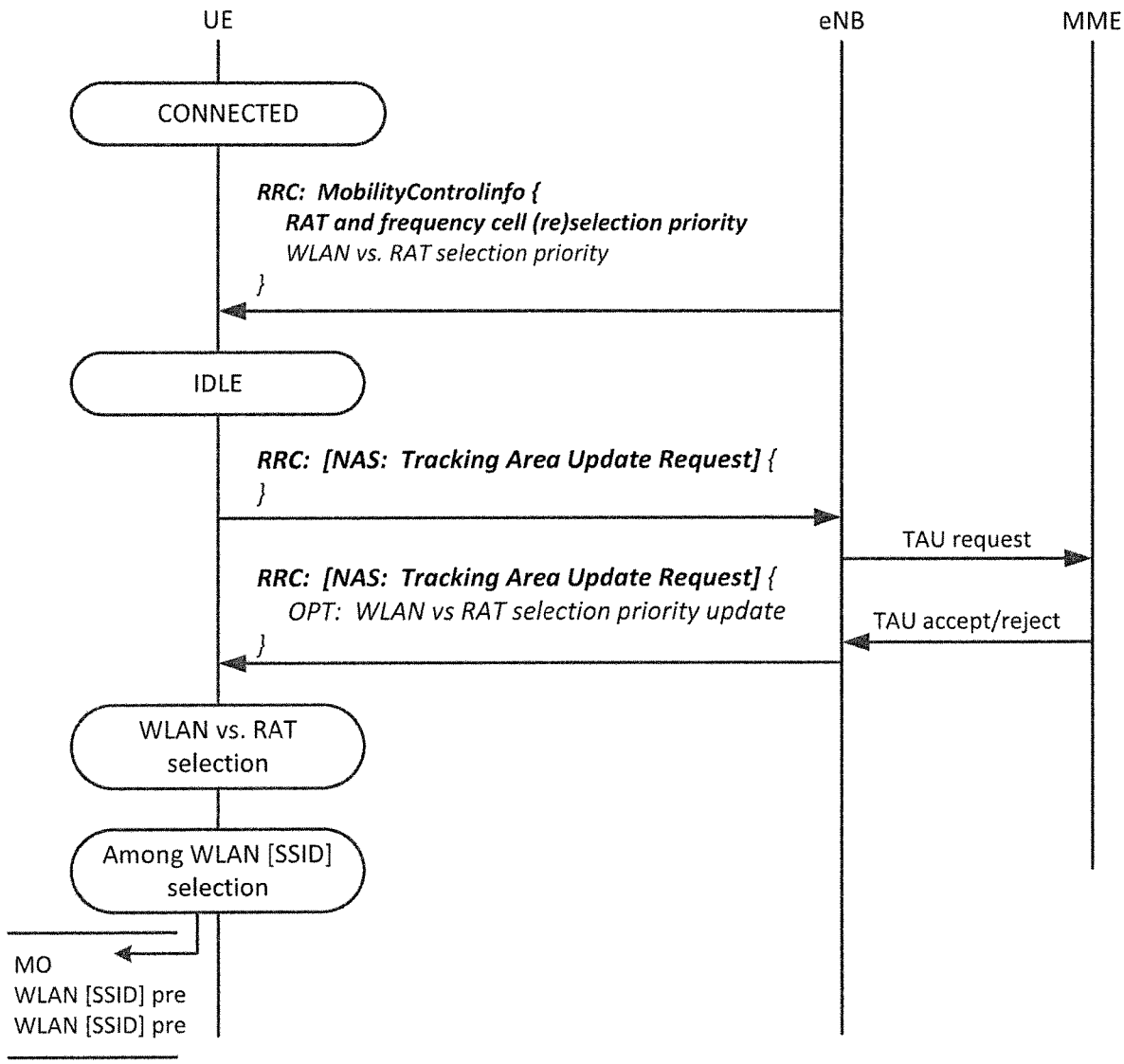
Figure 8:
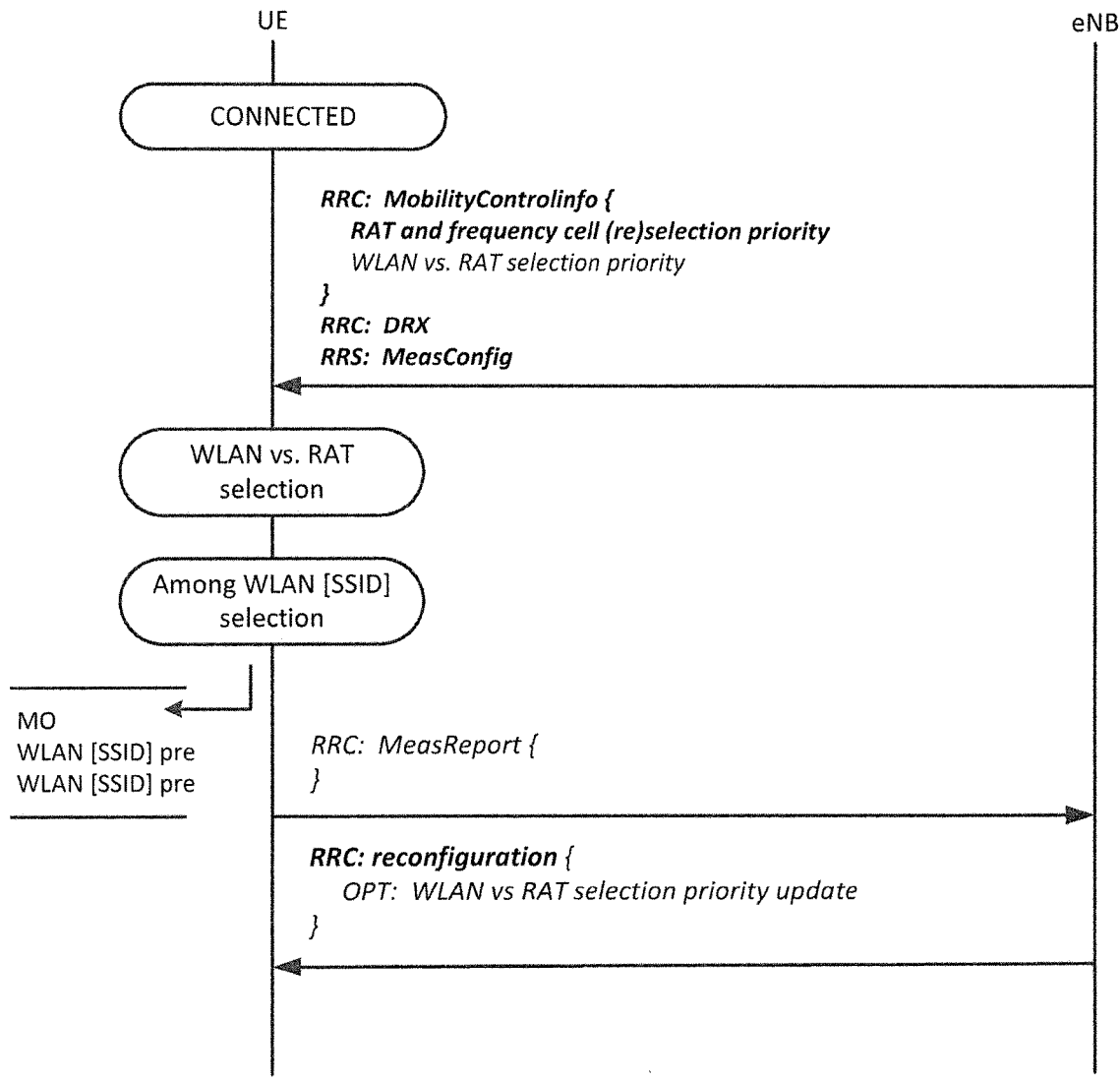
Figure 9:
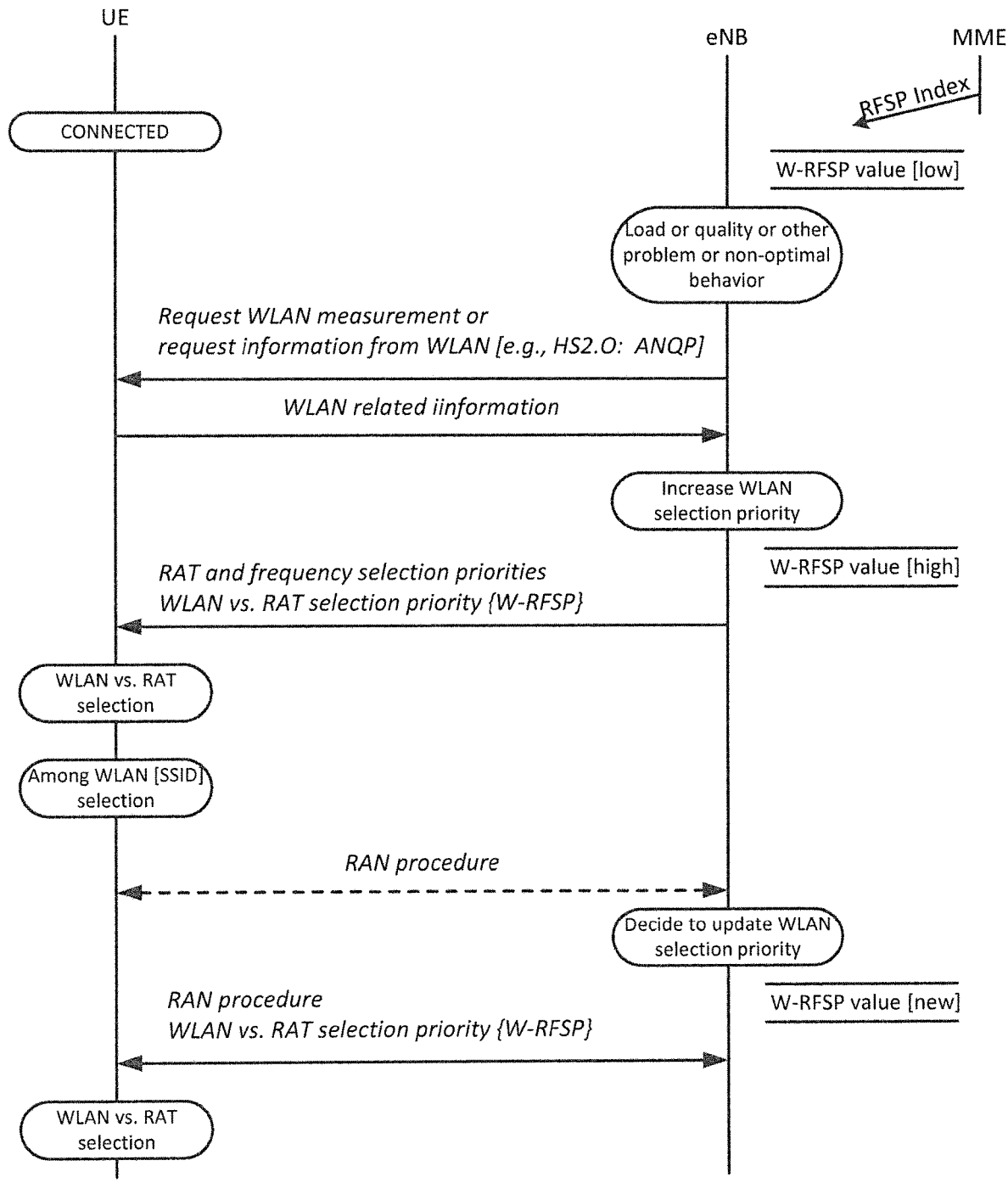
Figure 10:
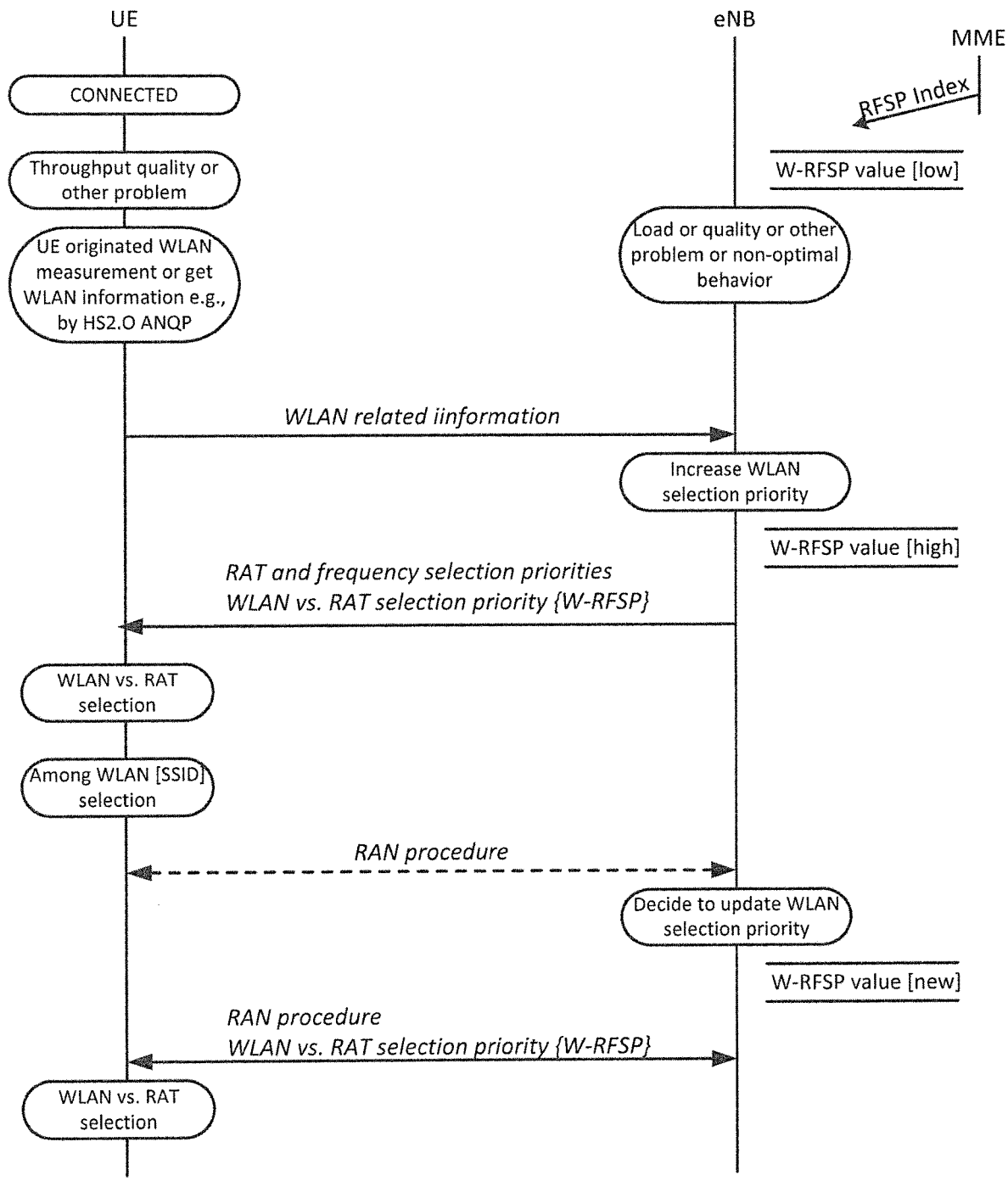
Figure 11:
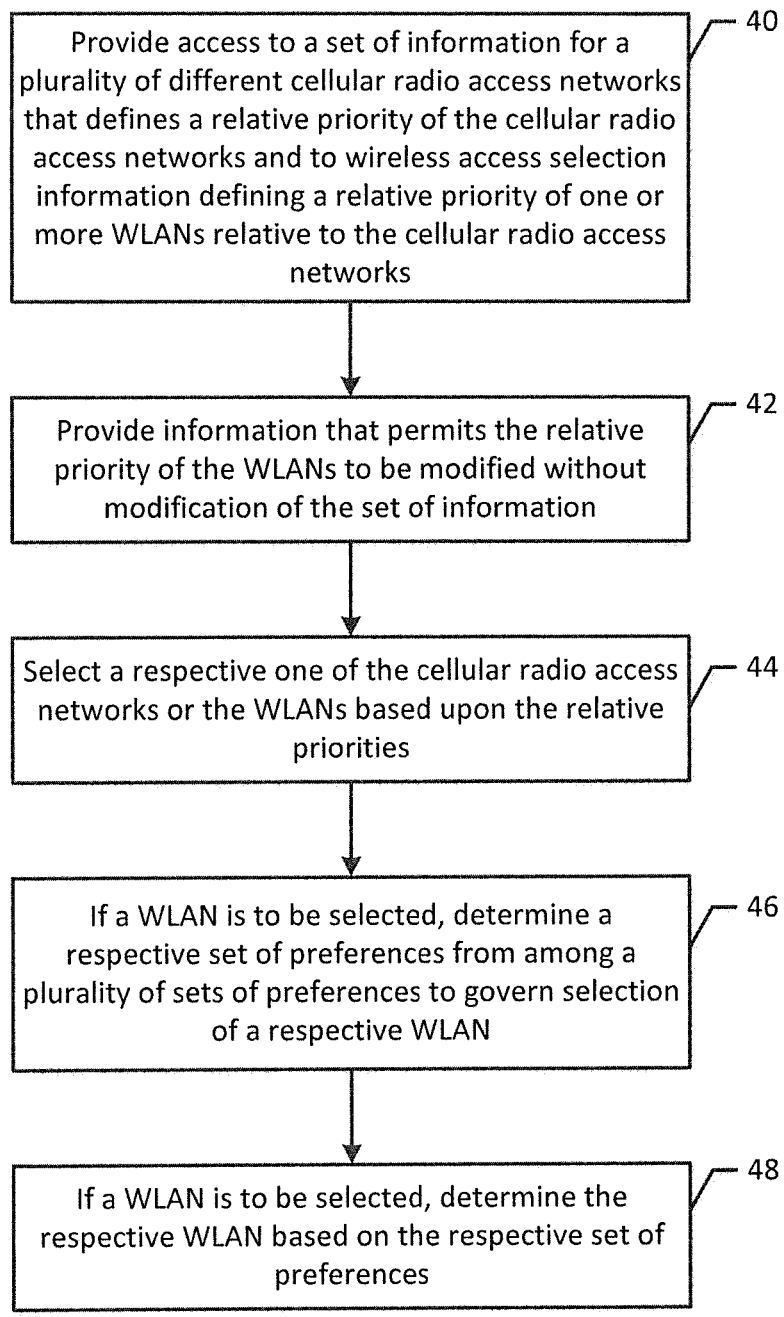
Figure 13:
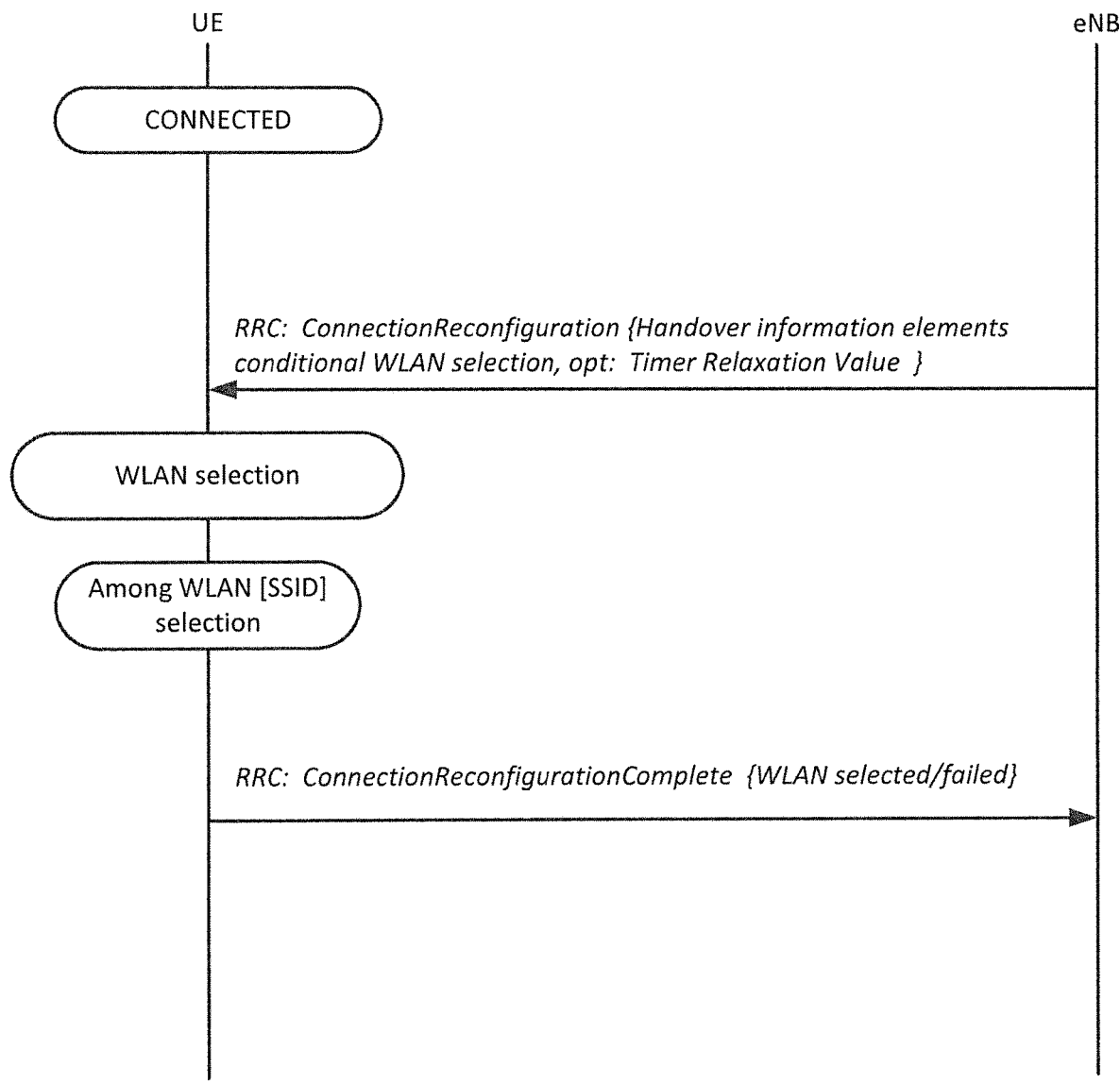

Having thus described certain example embodiments of the present disclosure in general terms, reference will hereinafter be made to the accompanying drawings, which are not necessarily drawn to scale, and wherein:

FIG. 1 is a schematic representation of a system within which an example embodiment of the present invention may be employed;

FIG. 2 is a block diagram of an apparatus that may be specifically configured in accordance to an example embodiment of the present invention;

FIG. 3 is a flowchart illustrating operations performed in accordance with an example embodiment of the present invention from the perspective of a network entity, such as an eNB;

FIG. 4 is a table of radio access technology and frequency selection priority (RFSP) profiles that may be utilized in accordance with an example embodiment of the present invention;

FIG. 5 is another table of (RFSP) profiles that may be utilized in accordance with another example embodiment of the present invention;

FIG. 6 is a block diagram illustrating the establishment of priorities for cellular radio access networks and for WLANs in accordance with an example embodiment of the present invention;

FIG. 7 is a signaling diagram in which the wireless access selection information is updated during an idle state in accordance with another example embodiment of the present invention;

FIG. 8 is a signaling diagram in which the wireless access selection information is updated during a connected state in accordance with another example embodiment of the present invention;

FIG. 9 is a signaling diagram in which measurements or other information regarding a wireless local area network are provided in response to a request from the network in order to permit updated of the wireless access selection information in accordance with another example embodiment of the present invention;

FIG. 10 is a signaling diagram in which measurements or other information regarding a wireless local area network are originated by the user equipment and provided to the network in order to permit updated of the wireless access selection information in accordance with another example embodiment of the present invention;

FIG. 11 is a flowchart illustrating operations performed in accordance with an example embodiment of the present invention from the perspective of the user equipment;

FIG. 12 is a set of preferences for facilitation selection of a respective one of a plurality of WLANs in accordance with an example embodiment of the present invention; and FIG. 13 is a signaling diagram in which a handover in the connected state to a WLAN is conditional in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to facilitate interworking between one or more cellular radio access networks and one or more wireless local area networks. In this regard, the method, apparatus and computer program product of an example embodiment may permit wireless local area networks to be prioritized relative to cellular radio access networks. If desired, the relative priority of selection among the wireless local area networks may be modified relative to the priorities of the cellular radio access network. These modifications to the relative priority may be made dynamically, such as in response to changes in the network conditions, interference, load, traffic activation, traffic termination, bearer reconfiguration, the user experience or the like and may be made on a relative granular basis, such as being specific to a user equipment, specific to a subscribed user class, specific to a group of users, specific to a cell, specific to a usage profile, specific to a traffic type, specific to one or more active sessions or the like.

Although the method, apparatus and computer program product of an example embodiment may be deployed in a variety of different systems, one example of a system that may benefit from the interworking of cellular radio access networks and wireless local area networks in accordance with an example embodiment of the present invention is depicted in FIG. 1. The system includes one or more user equipment 10 configured to communicate wirelessly, such as via an access network, with a network 14. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems.

The system of FIG. 1 also includes one or more access points 12, such as base stations, e.g., node Bs, evolved Node Bs (eNB), or the like. A cellular access point, such as a base station, may define and service one or more cells. The access points may, in turn, be in communication with a network 14, such as a core network via a gateway, such that the access points establish cellular radio access networks by which the user equipment 10 may communicate with the network. The system of FIG. 1 may include a plurality of different cellular radio access networks including, for example, an LTE radio access network, a UMTS radio access network, etc. Although not shown, the system may also include a controller associated with one or more of the cellular access points, e.g., base stations, so as to facilitate operation of the access points and management of the user equipment 10 in communication therewith. As shown in FIG. 1, a system may also include one or more wireless local area networks (WLANs), each of which may be serviced by a WLAN access point 16 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

An apparatus 20 as shown in FIG. 2 may be embodied by or otherwise associated with user equipment 10 and/or a network entity, such as an access point, e.g., a cellular access point 12, and may be specifically configured in accordance with an example embodiment in order to provide for interworking between cellular radio access networks and WLANs. The apparatus may be embodied by an access point, e.g., a cellular access point, and/or user equipment. The apparatus may include or otherwise be in communication with a processor 22, a memory device 24, a communication interface 26 and optionally a user interface 28.

As noted above, the apparatus 20 may be embodied by a network or user device, such as an access point 12 or user equipment 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

In some embodiments, the processor 22 (and/or co-processors or any other processing circuitry assisting or otherwise associated with the processor) may be in communication with the memory device 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a communications device 10 in communication with the apparatus 20. In this regard, the communication interface may include, for example, an antenna (or multiple antennas) and supporting hardware and/or software for enabling communications with a wireless communication network.

Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is embodied by the user equipment 10, the apparatus includes a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a speaker, or other input/output mechanisms. In one embodiment, the user interface includes the display upon indications of a plurality of tasks are presented, as described below. Alternatively or additionally, the processor may comprise user interface circuitry configured to control at least some functions of one or more user interface elements such as a display and, in some embodiments, a speaker, ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Referring now to FIG. 3, the operations performed by an apparatus 20, such as depicted in FIG. 2, that is embodied by or otherwise associated with a network entity, such as an access point 12, e.g., an eNB, of a cellular radio access network, are illustrated. As shown in block 30 of FIG. 3, the apparatus embodied or otherwise associated with an access point 12 may include means, such as the processor 22, the memory device 24 or the like, for maintaining a set of information for a plurality of different cellular radio access networks that defines the relative priorities of the cellular radio access networks. In this regard, the set of information defines the prioritized ordering of the cellular radio access networks that may be utilized by the user equipment 10 to communicate with the network. For example, the cellular radio access network having the highest priority will initially be considered by the user equipment to access the network 14, e.g., core network. If the cellular radio access network having the highest priority is unavailable or does not otherwise satisfy predefined operational parameters, the cellular radio access network that has the second highest priority may be considered by the user equipment to access the network. This process may be repeated for more lowly prioritized cellular radio access networks in the event that the more highly prioritized cellular radio access networks are unavailable or otherwise inappropriate.

In one embodiment, a network entity, such as an access point 12, may store a table of one or more RFSP profiles. Each profile is a set of information that defines the relative priorities of the cellular radio access networks. Each profile is identified by an index, such as an RFSP index. The set of information and, in one embodiment, the table of RFSP profiles may be provided for the radio access network (RAN), by core network 14 by network operation management software, and stored or otherwise maintained by the access point 12, such as within the memory device. As the RFSP profiles are provided widely to the RAN (not individually configured for each eNB), the RFSP profiles are generally relatively static and may be applicable to a large number of user equipment.

In one embodiment, the set of information, such as the table of RFSP profiles, may be provided by the access point 12 to the user equipment 10 and stored by the user equipment, such as within its memory device. For example, the set of information, such as the table of RFSP profiles, may be included within information elements that are transmitted from the access point to the user equipment. However, RFSP profiles as such need not be loaded to the UE as it is sufficient to inform the UE about the information elements defining the selected preferences from the table.

In an instance in which the access point 12 and the user equipment 10 store a plurality of sets of information, such as a table having a plurality of alternative preferences stored into the RFSP profiles, the RAN may advise the access point 12 as to the respective setting in the RFSP profile to be utilized and the access point may, in turn, advise the user equipment as to the respective RFSP profile to be utilized. In an embodiment, each of the plurality of RFSP profiles may be associated with a unique RFSP index. Thus, the access point may signal the RFSP index of the respective RFSP profile to the user equipment, such as within an information element of a radio resource control (RRC) message, e.g., an MobilityControl information element. By way of example, the set of information designated by RFSP index 1 in FIG. 4 includes five cellular radio access networks arranged in order of priority from the highest priority i.e. the most preferred choice (Priority 6 in this example) to the lowest priority (Priority 2) i.e. the least preferred choice from these alternatives. The cellular radio access networks are identified by the type of network, e.g., LTE, UMTS, second generation (2G), etc., and the frequency of the network, e.g., 2100 MHz, 2600 MHz, 210 MHz, 1800 MHz and 900 MHz.

In addition to the set of information that defines the relative priority of selection among a plurality of cellular radio access networks, the apparatus 20 may also include means, such as the processor 22, the memory device 24 or the like, for maintaining wireless access selection information defining a relative priority of selection among one or more WLANs relative to the cellular radio access networks. See block 32 of FIG. 3. In an example embodiment, the set of information that defines the relative priority of the cellular radio access networks may include an indication of the one or more WLANs. For example, the RFSP profile of FIG. 4 that is designated by RFSP index 2 provides an indication of one or more WLANs by the designation Wi-Fi present in the RFSP profile. As such, the RFSP profile associated with RFSP index 2 serves to not only define the relative priority of the cellular radio access networks, but also provides an indication that one or more WLANs should also be considered to service the user equipment. The relative position of the indication of the WLANs with respect to the designations of the cellular radio access networks may define the relative priority of the WLANs with respect to the cellular radio access network. Alternatively, the relative priority of the WLANs may be separately maintained with the reference to the WLANs within the RFSP profile merely serving as an indication that one or more WLANs should also be considered without providing any information regarding the relative priority of the WLANs with respect to the cellular radio access networks.

For example in case WLAN selection priority currently has value 5 (relatively high, but not the highest importance), it is probable that some cellular access is selected over any WLAN (even if WLAN selection by this setting would be allowed by the RFSP index 2). In case, WLAN selection priority would be updated to 7 (high importance) as indicated by the line extending from priority value 5 to priority value 7, it is favored that WLAN access is selected, if found in this location, over any cellular access selection. It is still possible that even if WLAN is the highest preference, the WLAN access point is not found with good enough signal quality and therefore it will not become selected, and the UE will remain in cellular access. Even in case in which WLAN as such has high priority, it is possible that UE when finding WLAN networks according to the WLAN mutual priorities will not find a suitable or acceptable WLAN network but only other non-preferred candidates, and therefore the cellular access still remains selected. Yet, it is possible that WLAN as having high priority, and UE when searching will find suitable WLAN networks from its priority list will select a favored WLAN and after selecting or testing it the UE will discover that the WLAN service will actually not meet the set thresholds or WLAN comparative metrics relative to the cellular access, which then will anyway cause UE to discard the experimented WLAN selection, even if it had high priority. This means that the high priority of relative access selection does not require that the WLAN access becomes selected but additional traffic routing policies, offload policies, and/or thresholds may determine if the selection is actually beneficial or not. The preference defines the relative importance of actively trying to get WLAN access relative to cellular access. Whether this will lead to the actual selection of the WLAN access and getting services from WLAN or whether to transfer the on-going services from one access to another access is yet subject to other inspection of settings such as policies, subscription, authentication, cost commitments, and/or thresholds thereof.

In an alternative embodiment, the set of information may be independent of and, therefore, not include, any indication of the WLANs. As shown in FIG. 5, for example, the plurality of RFSP profiles do not include any indication of the WLANs. However, in this embodiment, a relative priority may be separately maintained for one or more WLANs relative to the cellular radio access networks even though the RFSP profiles do not provide any indication of the WLANs. Alternatively, the relative priority may not be available at all, such as in the case in which the UE may select any convenient WLAN found in that location, where its access is authorized. Some WLANs may also provide open access.

As shown in block 34 of FIG. 3, the apparatus 20 embodied by or otherwise associated with an access point 12 may include means, such as the processor 22, the memory device 24 or the like, for permitting the relative priority of selection among the WLANs to be modified without modification to the set of information. In this regard, regardless of whether an indication of the WLANs is included within the set of information, such as within the table of RFSP profiles, the relative priority of the WLANs may be maintained in a manner independent of the set of information. In this regard, the relative priority of the WLANs may be separately maintained by both the access point and the user equipment 10, such as by being stored by the memory device or otherwise maintained by the processor. However, the relative priority of the WLANs may be maintained so as to be orthogonal to the set of information defining the relative priorities of the cellular radio access networks such that modification of the relative priority of the WLANs does not affect, alter or otherwise change the set of information. For example, although RFSP profile designated by RFSP index 2 of the embodiment depicted in FIG. 4 identifies the Wi-Fi network as having priority 5, the actual priority of each of the WLAN(s) may be different as the actual priority of the WLAN(s) may be defined by another value stored by the memory device or otherwise maintained by the processor.

Thus, the priority of the WLANs may be modified by changing the value stored by the memory device or otherwise maintained by the processor without any modification to the set of information, such as the RFSP profile. In the example of FIG. 5, the relative priority of the WLANs may initially have a value of 4, but may be modified to have a priority value of 7 as indicated by the line extending therebetween without modification of the set of information, such as the RFSP profile. As described below in conjunction with the operations of block 36, the apparatus embodied by or otherwise associated with the access point may then provide the modified priority of the WLANs to the user equipment.

As noted above and as shown in FIG. 6, the set of information, such as the table including one or more RFSP profiles, may be provided to an access point 12, such as an eNB, by the RAN and, as such, may be equally applicable to a plurality of user equipment, such as all of the user equipment serviced by the RAN. However, the relative priority of selection among the WLANs may be modified on a much more granular basis since the relative priority of the WLANs is defined based upon signals exchanged between the access point 12 and the user equipment 10 and is not dependent upon information provided by the RAN. As such, the relative priority of WLANs may be modified in a manner specific to the user equipment, in a manner specific to the access point, in a manner specific to a cell serviced by the access point, in a manner specific to a particular location or the like. By permitting the relative priority of the WLANs to be modified on a more granular basis, the method, apparatus and computer program product of an example embodiment may recognize that the WLANs available to user equipment and the relative priority of those WLANs may vary between cell areas, even though the cellular radio access networks remain fairly consistent over a large area.

Since the relative priority of selection among the WLANs may be modified in a dynamic and individualized manner in accordance with an example embodiment, the relative priority of the WLANs may be modified for various purposes based on one or more parameters, e.g., cell load, interference, bearer (e.g., bearer types, traffic types), bearer quality (e.g., throughput, delay), location, measurement feedback from the user equipment 10, measurements by the user equipment of a WLAN (e.g., channel search and detection results, beacon power), information gathered by the user equipment relating to a WLAN (beacons, queries, access network query protocol (ANQP)), user experience, problem detection, etc. For example, in an instance in which the cellular radio access networks are experiencing a relatively heavy load, the relative priority of the WLANs may be increased relative to the priority of the cellular radio access networks so that the user equipment is more likely to utilize a WLAN. Additionally, or alternatively, in an instance in which a user equipment that is currently served by a cellular radio access network has a user experience that is less than desired, such as in terms of throughput, delay or the like, the relative priority of the WLANs may be modified by increasing the relative priority of the WLANs for the respective user equipment such that the user equipment is more likely to utilize a WLAN.

While legacy priorities in the table of RFSP profiles may already occupy all the priority values, it may not be possible to add a WLAN priority in between the legacy priorities without impacting the other preferences in the profile or without ending up having two access selections with an equal priority, which in some cases may be confusing. For this reason, in an example embodiment, a comb-like structure of priorities may be set by signaling between the access point 12 and the user equipment 10, where the WLAN base priority gets a value 0.5 and its modifications happen by integer steps. This way the newly added WLAN priority may move in the RFSP profile relative to other access selection priorities without any change to them and yet the WLAN priority may have a unique priority in the un-disturbed order of priorities. This fractional priority may be signaled in the embodiments described above by setting WLAN base priority in enum {0; 0.5} and indexing thereafter with integers. Also, it is noteworthy that arithmetic operations with indexes may be used instead of or in addition to setting values. Wi-Fi selection may therefore get a value Wi-Fi priority=value or it may get a value Wi-Fi priority=Wi-Fi priority+3 to increase the priority or Wi-Fi priority=Wi-Fi priority −3 to decrease the priority, respectively. It is also possible, if the cellular access priority values are not known by the module setting the Wi-Fi priority, to assign a value Wi-Fi priority="label"+1. In here the "label" may be a string representing a cellular radio access network, such as a string of "LTE2600" or "UMTS2100" for example. In this manner, the value of the announced label in the currently valid set of priorities may be determined and the Wi-Fi priority may be set to a value one higher than the actual priority value of the label in the profile. This relative priority solves a situation, where knowledge of the source of priority settings was somehow confusing, for example between the home network and the visited network given priority values while UE is roaming. For example, if the home network profile includes UMTS2100 setting with priority 5, whereas in the visited network profile has UMTS2100 with priority 4, updating the Wi-Fi priority to UMTS2100+1 would comply to both of the profiles. Typically, this kind of discrepancy does not appear, because the serving eNB is expected to have a resolved table of RFSP profiles negotiated by the home subscription network and the visited network. However, in some situations this could still be the case if selecting a visited network among multiple candidates and if the relationship of the home subscription network and visited network do not cover Wi-Fi definitions. Another situation, where this embodiment could give benefits is a home network given high priority Wi-Fi selection exceeding all the possible visited network set cellular access priorities set by the visited RFSP pointed profile. This would cause Wi-Fi access selection over the visited network service. This could be a cost benefit for the user and for the home operator. In another example, the visited network could increase the Wi-Fi priority in the profile to a higher value to guide a roaming user to select Wi-Fi more aggressively than guided originally by the home subscription network or in relation to the guidance network gives to other non-roaming users in the same serving cell.

As shown in block 36 of FIG. 3, the apparatus 20 embodied by or otherwise associated with a network entity, such as an access point 12, may include means, such as the processor 22, the communication interface 26 or the like, for causing notification to be provided to the user equipment 10 of at least some of the set of information and the wireless access selection information. As noted above, the notification may be provided by signaling the wireless access selection information, including modifications to the wireless access selection information such as modifications to the relative priority of selection among the WLANs, in an information element independent of the set of information. As such, the wireless access selection information may be provided to the user equipment without also providing the set of information defining the relative priorities of the cellular radio access networks. In one embodiment, the notification may be optional. Alternatively, the notification may be more imperative, such as in the form of a command, to the UE for the radio access selection according to the information elements that are provided and/or the preferences provided thereby.

In an example embodiment, the notification may be provided in a connected state prior to a transition to an idle state. As shown in FIG. 7, user equipment (UE) 10 in the connected state may receive the set of information (RAT and frequency cell (re)selection priority) and wireless access selection information (WLAN vs radio access technology (RAT) selection priority) from the access point 12, such as an eNB, such as MobilityControlInfo in an RRC message. In an example embodiment, the user equipment may transition from the connected state to the idle state prior to selecting a respective one of the cellular radio access networks or the WLANs. After entering the idle state, the user equipment of one example embodiment may continue to camp on a cellular radio access network and, as such, may transmit one or more tracking area update (TAU) requests and may receive a tracking area update response from the eNB following an exchange of a TAU request and a TAU accept or reject between the eNB and an MME. In conjunction with the tracking area update response, the eNB may provide any modification of a relative priority of selection among the WLANs with respect to the cellular radio access networks (WLAN vs RAT selection priority update). Thereafter, in an instance in which the user equipment is to select an access network by which to access the network 14, e.g., the core network, the user equipment may determine whether a cellular radio access network or a wireless local area network is to be utilized based upon the relative priorities and, in an instance in which the wireless local area network has the highest relative priority, may determine which of the candidate wireless local area network is to be selected, such as from among the WLANs identified by a management object (MO) as described below.

Although the modification to the relative priority of selection among the WLANs and the subsequent selection of an access network occurred during the idle state in the embodiment of FIG. 7, the modification to the relative priority of the WLANs and the subsequent selection of an access network may, instead, occur during the connected state. In this regard, FIG. 8 illustrates the signaling exchange between the user equipment 10 and an access point 12, such as an eNB, during a connected state. In this regard, the user equipment that is connected with the eNB may receive a set of information and the wireless access selection information, such as may be included as MobilityControlInfo in an RRC message. The user equipment of this example embodiment may also receive a measurement configuration (MeasConfig) request from the access point. In this example embodiment, the user equipment may then determine whether a WLAN access network or a cellular radio access network is to be selected for use as access network, such as based upon their relative priorities. In an instance in which the WLAN has the higher priority, the WLAN may be selected to be an access network with the user equipment then determining which of a plurality of candidate WLANs is to serve the access network, such as from among the WLANs identified by a management object (MO) as described below. In the illustrated embodiment, the mobile terminal may thereafter respond to the measurement configuration request by issuing a measurement report (MeasReport). Based upon the measurement report, the apparatus embodied or otherwise associated with the access point may modify the relative priority of the WLANs with respect to the cellular radio access networks and, as such, may provide a reconfiguration message to the user equipment that includes the modification of the relative priority of the WLANs.

As noted above in conjunction with the embodiment of FIG. 8, a determination as to whether the relative priority of selection among the WLANs is to be modified may be based upon various measurements, such as signal strength, interference, access delay, communication delay, number of associations, capacity of associations, offered bit rates with or without backhaul limitations etc. The measurements that may be performed in order to determine if the relative priority of the WLANs is to be modified may be initiated by the network, such as by an access point 12, e.g., eNB, or by the user equipment 10. As shown in FIG. 9 in which the access point initiates the measurements that will, in turn, provide for modification of the relative priority of the WLANs, the user equipment may initially be in a connected state. Additionally, the original priority of the WLANs represented by the W-RFSP value in FIG. 9 may be relatively low, as provided by the network, such as the MME the home subscriber server (HSS) or a visited network, to the access point. In an instance in which the network, such as the access point experiences a load, quality or other problem, resulting in non-optimal behavior of the network in regards to the communications with the user equipment, the access point may cause a request for WLAN measurement or a request for information from the WLAN, e.g., by hot spot (HS) 2.0: ANQP, to be issued. The user equipment, in turn, may provide the requested information.

Based upon the WLAN-related information, the access point 12, such as the eNB, may determine that the relative priority of selection among the WLANs is to be increased and the modification of the relative priority of the WLANs may then be provided by the access point to the user equipment 10, either with or without the set of information regarding relative priorities of the cellular radio access network. Thereafter, the user equipment may select an access network, such as by determining whether a cellular radio access network or a WLAN is to be selected based upon the relative priorities. This selection may be guided or assisted by the priorities, or the selection may be mandated or obliged by the priorities. In an instance in which a WLAN is to be selected, the particular WLAN to be utilized as the access network may be determined as will be described below. The user equipment and the access point may then engage in an RAN procedure. During the RAN procedure, the access point, such as the eNB, may again determine that the relative priority of the WLANs should be modified with the modification of the relative priority of the WLANs then being provided by the access point to the user equipment which may, in turn, utilize the modified WLAN selection in conjunction with a renewed selection process in which the user equipment determines whether the WLAN or a cellular radio access network should be utilized as the access network.

Alternatively, the user equipment 10 may initiate the measurements that may, in turn, cause the relative priority of selection among the WLANs to be modified. As shown in FIG. 10, the user equipment may be in a connected state, but may experience throughput, quality or another problem. Similarly, the access point 12, such as an eNB, may detect a load, quality or other problem resulting in non-optimal behavior. The user equipment of this embodiment may originate a WLAN measurement or otherwise obtain WLAN information, such as by HS2.0 ANQP. The user equipment may then provide the WLAN-related information to the access point which may, in turn, consider the WLAN-related information in regards to a modification of the relative priority of the WLANs with respect to the cellular radio access networks. In the illustrated embodiment, the initial relative priority of the WLANs may be relatively low, as provided by the network, such as an MME. Based upon the updated WLAN-related information, the access point, such as the eNB, may determine to increase the WLAN selection priority, as by increasing the relative priority of the WLANs with respect to the cellular radio access networks.

In this regard, the access point 12, such as the eNB, may provide the modification of the relative priority of selection among the WLANs to the user equipment 10, either with or without the set of information regarding relative priorities of the cellular radio access network. Thereafter, the user equipment may select an access network, such as by determining whether a cellular radio access network or a WLAN is to be selected based upon the relative priorities. In an instance in which a WLAN is to be selected, the particular WLAN to be utilized as the access network may be determined as will be described below. The user equipment and the access point may then engage in an RAN procedure. During the RAN procedure, the access point, such as the eNB, may again determine that the relative priority of the WLANs should be modified with the modification of the relative priority of the WLANs then being provided by the access point to the user equipment which may, in turn, utilize the modified WLAN selection in conjunction with a renewed selection process in which the user equipment determines whether the WLAN or a cellular radio access network should be utilized as the access network.

Referring now to FIG. 11, the operations performed by an apparatus 20, such as depicted in FIG. 2, that is embodied by or otherwise associated with user equipment 10, are illustrated. As shown in block 40 of FIG. 11, the apparatus embodied or otherwise associated with the user equipment may include means, such as the processor 22, the memory device 24 or the like, for providing access to a set of information for a plurality of different cellular radio access networks that define a relative priority of selection among the cellular radio access networks. As described above, the set of information may be embodied as a table of RFSP profiles. The set of information, such as the RFSP profiles, may be, for example, provided by the access point 12 and stored by the memory device of the user equipment or otherwise maintained or accessible by the processor of the user equipment.

The apparatus 20 embodied by or otherwise associated with user equipment 10 may also include means, such as the processor 22, the memory device 24 or the like, for providing access to wireless access selection information defining a relative priority of selection among one or more WLANs relative to the cellular radio access networks. As noted above, the wireless access selection information may be provided by an access point 12, such as an eNB, and may be stored by the memory device or otherwise maintained by the processor of the user equipment. As illustrated in FIGS. 4 and 5, a set of information may either include an indication of the WLANs or be independent of any indication of the WLANs.

As set forth in block 42 of FIG. 11, the apparatus 20 embodied by or otherwise associated with the user equipment 10 may also include means, such as the processor 22, the communication interface 26 or the like, for providing information that permits the relative priority of selection among the WLANs to be modified without modification of the set of information, that is, without modifying the set of information defining the relative priorities of the cellular radio access networks. The modification may be defined in various manners, such as decreasing the relative priority of the WLANs by a predefined value or by defining the priority of the WLANs based upon the priority of another access network, such as a cellular radio access network. As described above in conjunction with FIGS. 8-10, the user equipment, such as the processor, may make measurements of the performance of the WLANs, such as in response to detection of a throughput, quality or other problem, e.g., in response to the throughput, quality or other performance parameter failing to satisfy a predetermined criteria, or in response to a request by the access point, and may provide this information to the access point for a determination of whether a modification of the relative priority of the WLANs is appropriate.

As shown in block 44 of FIG. 11, the apparatus 20 embodied by or otherwise associated with the user equipment 10 may also include means, such as the processor 22 or the like, for selecting one of the cellular radio access networks or the WLANs based upon their relative priority. In an instance in which one of the WLANs is to be selected, the apparatus may include means, such as the processor or the like, for determining the respective WLAN to be selected based upon a set of preferences, independent of the set of information and the wireless access selection information. See block 48. In this regard, the wireless access selection information may define the relative priority of one or more WLANs relative to the cellular radio access network, but may not identify the particular WLAN to be utilized. Instead, the user equipment may be configured to communicate with any one of a plurality of different WLANs depending upon the location of the user equipment and the WLANs that are available to the user equipment. As such, the user equipment, such as the processor, the memory device 24 or the like, may maintain a set of preferences, independent of the set of information and the wireless access selection information, that defines one or more candidate WLANs that may be selected by the user equipment as well as the order of preference for those WLANs.

In an example embodiment, the set of preferences may be maintained by a management object (MO), such as an ANDSF management object provided, for example, by an ANSDF server as shown, for example, by FIG. 6. One example on ANDSF management object is shown in FIG. 12 in which a preference, e.g., a WLAN, having a greater priority value is more highly prioritized than a preference, e.g., a different WLAN, having a lower priority value. In this example, the ANDSF management object indicates that according to the most highly prioritized preference a WLAN having an SSID of OwnHotspot should be utilized for data having a throughput of greater than 20 Mbps. If the throughput is to be less than 20 Mbps, a set of preferences having a lower preference, such as priority 8, may, instead, be utilized. For a respective preference, if the designated WLAN is not available or the criteria associated with the designated WLAN cannot be satisfied, the next lower preference is selected. As shown, the ANDSF management object may not only include preferences with respect to the WLANs, but also one or more cellular radio access networks, if so desired. In here, OwnHotspot is an example of the cellular operators' provided WLAN hotspot. In another embodiment, other parties, such as the user, an enterprise and/or a roaming partner, may have established access points, hotspots or wireless networks that may be considered, in the case of which they may be announced inside the ANDSF management object relative to the other hotspots, or they may appear as selected by the user of the UE beyond the scope of the ANDSF MO having HomeHotspot as the highest priority above all MOs or other configurations set otherwise.

In an example embodiment, the apparatus 20 embodied by or otherwise associated with the user equipment 10 may be associated with or otherwise have access to a plurality of sets of preferences, each of which govern the selection of a respective WLAN. For example, the apparatus embodied by or otherwise associated with the user equipment may include a plurality of management or other objects that each defines the selection of a respective WLAN from among a plurality of WLANs. In this regard, the plurality of objects may include one or more management objects, access network discovery and selection objects, hotspot objects, home network objects, visited network objects, device management objects, vendor specific objects and/or organization specific objects. The sets of preferences defined by the various objects may be based upon a variety of different information including WLAN preferences, selection history, information provided by a plug-in object, a definition present in the subscriber identification module or an access network certificate stamp as a software configuration in the user equipment. Regardless, in an instance in which a WLAN is selected as an access network instead of a cellular radio access network, the apparatus of this embodiment may include means, such as a processor 22 or the like, for determining a respective set of preferences from among the plurality of sets of preferences and then determining the respective WLAN to be selected from the respective set of preferences that was selected from amongst the plurality. See blocks 46 and 48 of FIG. 11. The respective set of preferences may be determined in various manners, but in an example embodiment, the apparatus, such as a processor, may determine the respective set of preferences based upon a predefined prioritized ordering of the sets of preferences, e.g., MOs, that may favor operator-friendly sets of preferences if available.

If favored by the home network, the user equipment 10 may be asked by the network, such as the access point 12, e.g., eNB, to store a local copy of the RAN-given Wi-Fi priority index (W-RFSP) in the user equipment for a possible reselection of a network. In this embodiment, the user equipment could have a carry-on result of the Wi-Fi priority from the home network, unless for a reason overwritten by the serving eNB in the visited network. This stored index enables that UE which would not be given any Wi-Fi selection notification later in a visited network could have this RAN-given priority of Wi-Fi valid. This scenario may be done, for example, in case the home network is confident that the user equipment has an up to date ANDSF MO that makes the user equipment behavior beneficial for the user in terms of Wi-Fi selection.

This kind of user equipment-stored W-RFSP value could also serve, in addition to the visited network case, in a scenario in which the user equipment is moving in the home network in domains or locations or cell layers, where this RAN level mechanism is not yet implemented. In this case, an eNB having the mechanism implemented could extend the use of the index over cell layers, locations and times until the next update becomes feasible again. This option of a locally stored Wi-Fi priority may be disabled by the RFSP selection by the serving eNB. A locally stored W-RFSP index given in a macro cell may also apply to pico cell layers of Physical Cell Identity range [x-y], or pico cells in carrier frequency fx, or may be valid for next 2 hours, etc.

As described above, the user equipment 10 may be in a connected state or an idle state while making a selection of a respective WLAN, although the user equipment may remain attached to a cellular radio access network throughout such that the user equipment may be steered back to cellular access in a controlled fashion. In an instance in which the user equipment is in an idle state while selecting the respective WLAN, the user equipment may include means, such as the processor 22, a communication interface 26 or the like, for camping on a cellular radio access network based upon the set of information, that is, in the priority order defined by the set of information, while selecting the respective WLAN. In this regard, FIG. 7 illustrates a manner in which the user equipment of one example embodiment may camp on a cellular radio access network while selecting the respective WLAN. Alternatively, in an instance in which the user equipment is in a connected state while selecting the respective WLAN, the apparatus may include means, such as the processor, communication interface or the like, for remaining in a connected state with the cellular radio access network while selecting the respective WLAN. See FIGS. 8-10.

In the connected state, the user equipment 10 may be configured in accordance with a discontinuous reception transmission (DRX) pattern that takes into account that WLAN selection was allowed or favored by the set of preferences. The network may also allow DRX operation in the connected state without considering the possible impact of having preferred WLAN selection. In this case, the cellular operation may continue normally in parallel to WLAN operation if the user equipment implementation allows, and no compromises have to be tolerated. Typical comprises may be, for example, interference, power or implementation limitations, such as chip internal or external buses or memory accesses, Even in an instance in which compromises are necessary, these compromises may be well measured, tolerated and even constrained in some implementations.

In the connected state, an embodiment of the invention may work in the RRCConnectionReconfiguration-procedure that is configured for handover. According to this embodiment, the handover information elements may exist as typical, however there may additionally be a condition for handover set with a higher priority WLAN selection with the setting provided by the access point 12, such as an eNB, or predefined.

This may be implemented in a way that for a handover, first the WLAN search and selection is executed in response to a notification from the access point 12, such as the eNB, and in case WLAN meets the possible MO definitions, the condition is considered by the user equipment 10 to be satisfied and a WLAN will be selected as the handover target, instead of a given cellular target cell, as shown in FIG. 13. If the WLAN condition in the handover is not met, for example WLAN is not found or its parameters do not meet the selection criterion, a cellular target cell is selected by the user equipment instead, as typical. In this embodiment of a handover procedure, a relaxation of execution time may be provided by the access point, such as the eNB, and applied by the user equipment to provide the user equipment with additional time beyond that traditionally provided for a selection—first to test the availability of a WLAN and still successfully execute the handover. This relaxation time may be part of the WLAN conditioned information elements, as shown in FIG. 13. In an instance in which the conditional handover is successful as shown in FIG. 13 as well as an instance in which the conditional handover is unsuccessful, a ConnectionReconfigurationComplete message from the user equipment 10 to the access point 12, e.g., the eNB, may include an information element to announce the resulting status of the WLAN selection, that is, either selected or failed, to the access point, such as the eNB.

This conditional handover may be given to the user equipment by the access point, such as the eNB, with WLAN selection information elements only without any cellular target cell. In this case, if WLAN is not found, the UE will remain in the serving eNB. Alternatively, if a radio link failure is encountered within a predefined time period, the UE may try to execute ConnectionReestablish-procedure to any of the prepared target cells.

In case of conditional handover to WLAN and the WLAN meets the expected handover criterion, the handover will successfully happen to the WLAN. The eNB connection may remain in a state of less activity, either by idle state transition or setting a long DRX with the eNB. Conversely, in an instance in which the handover criterion is not satisfied and the user equipment 10 continues to be serviced by a cellular radio access network, the user equipment may be serviced by the access point that provided the notification, the user equipment may re-establish a connection to any one of one or more prepared cells or the user equipment may select a candidate target cell identified by one of more of the handover information elements.

As described, a method, apparatus and computer program product are therefore provided in order to facilitate interworking a plurality of cellular radio access networks, radio access technologies and WLANs. In an example embodiment, a method, apparatus and computer program product permit the relative prioritization and, as a result, the order of selection of the cellular radio access networks and the WLANs to be dynamically varied based upon various conditions, such as network load, traffic volume, interference, traffic activation, traffic termination, radio bearer quality, radio bearer requirement, bearer reconfiguration, user experience or the like. As such, the method, apparatus and computer program product of an example embodiment may define the relative prioritization between the cellular radio access networks and the WLANs on a more granular basis, such as on a basis specific to a user equipment, specific to a subscribed user class, specific to a group of users, specific to a cell, specific to a usage profile, specific to a traffic type, specific to one or more active sessions or the like.

As described above, FIGS. 3 and 11 are flowcharts of an apparatus 20, method, and computer program product according to example embodiments of the invention from the perspective of the network, such as an access point 12, and user equipment 10, respectively. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. The computer program product may be embodied as an application that is configured to implement, for example, at least certain ones of the operations of the flowcharts of FIGS. 3 and 11.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
maintaining, at a base station, a set of information for a plurality of cellular radio access networks that defines a first relative priority of selection among the plurality of cellular radio access networks;
maintaining, at the base station, a wireless access selection information defining a second relative priority of selection among one or more wireless local area networks;
permitting the base station to modify the wireless access selection information without modifying the first relative priority of selection, and store the wireless access selection information separately from the set of information defining the first relative priority of selection; and
sending, by the base station, a notification in an information element that provides, to a user equipment, a local copy of the wireless access selection information having the modified second relative priority of selection among the one or more wireless local area networks that is independent of a selection information defining a third relative priority of selection between the one or more wireless local area networks and the plurality of cellular radio access networks.

2. The method according to claim 1, wherein the set of information includes an indication of the wireless local area network.

3. The method according to claim 1, wherein the set of information is independent of any indication of the one or more wireless local area networks.

4. The method according to claim 1, wherein the wireless access selection information is modified to be specific to a cell associated with the base station, specific to the user equipment, specific to a subscribed user class, specific to a group of users, specific to a usage profile, specific to a traffic type, and/or specific to one or more active sessions.

5. The method according to claim 1, wherein the wireless access selection information is signaled in the information element independently of the set of information.

6. The method according to claim 5, wherein the wireless access selection information is provided in response to the user equipment being in a connected state prior to a transition to an idle state.

7. The method according to claim 1, wherein the providing of the wireless access selection information to the user equipment causes the user equipment to search, detect, and select from among one or more wireless local area networks according to the wireless access information while the user equipment maintains a connected state to the base station.

8. The method according to claim 1, wherein the providing of the wireless access selection information causes the user equipment to search, detect, and select one or more wireless local area networks for a conditional handover, wherein the conditional handover is executed in response to a handover criterion being satisfied, and wherein the user equipment continues to be serviced by a same base station in response to the handover criterion not being satisfied.

9. An apparatus comprising:
at least one processor and at least one memory including computer program code, the at least one memory and the computer program code configured to, with the processor, cause the apparatus to at least:

maintain a set of information for a plurality of cellular radio access networks that defines a first relative priority of selection among the plurality of cellular radio access networks;
maintain a wireless access selection information defining a second relative priority of selection among one or more wireless local area networks;
permit the apparatus to modify the wireless access selection information without modifying the first relative priority of selection, and store the wireless access selection information separately from the set of information defining the first relative priority of selection; and
send a notification in an information element that provides, to a user equipment, a local copy of the wireless access selection information having the modified second relative priority of selection among the one or more wireless local area networks that is independent of a selection information defining a third relative priority of selection between the one or more wireless local area networks and the plurality of cellular radio access networks.

10. The apparatus according to claim 9, wherein the set of information includes an indication of one or more wireless local area networks.

11. The apparatus according to claim 9, wherein the set of information is independent of any indication of the one or more wireless local area networks.

12. The apparatus according to claim 9, wherein the wireless access selection information is modified to be specific to a cell associated with the base station, specific to the user equipment, specific to a subscribed user class, specific to a group of users, specific to a usage profile, specific to a traffic type, and/or specific to one or more active sessions.

13. The apparatus according to claim 9, wherein the providing of the wireless access selection information comprises a signaling of the wireless access selection information in the information element independently of the set of information.

14. The apparatus according to claim 13, wherein the wireless access selection information is provided in response to the user equipment being in a connected state prior to a transition to an idle state.

15. The apparatus according to claim 9, wherein the providing of the wireless access selection information to the user equipment causes the user equipment to search, detect, and select from among one or more wireless local area networks according to the wireless access information while the user equipment maintains a connected state to the base station.

16. The apparatus according to claim 9, wherein the providing of the wireless access selection information causes the user equipment to search, detect, and select one or more wireless local area networks for a conditional handover, wherein the conditional handover is executed in response to a handover criterion being satisfied, and wherein the user equipment continues to be serviced by a same base station in response to the handover criterion not being satisfied.

17. An apparatus comprising:
at least one processor and at least one memory including computer program code, the at least one memory and the computer program code configured to, with the processor, cause the apparatus to at least:
receive, from a base station, a notification in an information element that provides, to the apparatus, a local copy of a wireless access selection information having a modified priority of selection among one or more wireless local area networks, the base station maintaining a set of information and the wireless access selection information, the set of information defining a first relative priority of selection among a plurality cellular radio access networks, the wireless access selection information defining a second relative priority of selection among the one or more wireless local area networks that is independent of a selection information defining a third relative priority of selection between the one or more wireless local area networks and the plurality of cellular radio access networks, the base station being permitted to modify the wireless access selection information without modifying the first relative priority of selection, and store the wireless access selection information separately from the set of information defining the first relative priority of selection;
select, based at least on the set of information and the wireless access selection information having the modified priority of selection, one of the plurality of cellular radio access networks or the one or more wireless local area networks; and
connect, based at least on the selection, to the selected one of the plurality cellular radio access networks or the one or more wireless local area networks.

18. The apparatus according to claim 17, wherein the set of information includes an indication of the one or more wireless local area networks.

19. The apparatus according to claim 17, wherein the set of information is independent of any indication of the one or more wireless local area networks.

20. The apparatus according to claim 17, wherein the at least one memory and the computer program code are further configured to, with the processor, cause the apparatus, select a wireless local area network based upon a set of preferences, and wherein the wireless local area network is selected independent of the set of information and the wireless access selection information.

21. The apparatus according to claim 20, wherein the at least one memory and the computer program code are further configured to, with the processor, cause the apparatus to determine a respective set of preferences from among a plurality of sets of preferences to govern the selection of the wireless local area network.

22. The apparatus according to claim 20, wherein the at least one memory and the computer program code are further configured to, with the processor, cause the apparatus to camp on the one of the plurality of cellular radio access networks based upon the set of information while selecting the wireless local area network.

23. The apparatus according to claim 20, wherein the set of preferences is provided by a management object, an access network discovery and selection object, a hotspot object, a home network object, a visited network object, a device management object, a vendor specific object or an organization specific object.

24. The apparatus according to claim 20, wherein the set of preferences is based upon a plugin object, one or more wireless local area network preferences, a selection history or a definition present in the subscriber identification module, and/or an access network certification stamp as a software configuration.

* * * * *